United States Patent

Derango et al.

[11] Patent Number: 5,867,491
[45] Date of Patent: Feb. 2, 1999

[54] PACKET VOTING SERVER AND ASSOCIATED METHOD FOR PERFORMING VOTING SERVICES ON MULTIPLE RADIO CHANNELS SIMULTANEOUSLY

[75] Inventors: Mario Frank Derango, Wauconda; Gregory Allan Dertz, Algonquin; Paul John Smith, Glen Ellyn, all of Ill.

[73] Assignee: Motorola, Inc., Schaumburg, Ill.

[21] Appl. No.: 678,463

[22] Filed: Jun. 30, 1996

[51] Int. Cl.⁶ .............................. H04B 7/00; H04L 12/26
[52] U.S. Cl. .................. 370/329; 370/338; 370/349; 455/450; 455/67.1
[58] Field of Search ...................... 370/479, 392, 370/401, 312, 328, 329, 338, 340, 349, 389; 455/414, 418, 419, 420, 450, 452, 503, 507, 509, 517, 524, 67.1, 67.7

[56] References Cited

U.S. PATENT DOCUMENTS

| | | | |
|---|---|---|---|
| 5,249,292 | 9/1993 | Chiappa | 370/392 |
| 5,491,688 | 2/1996 | Bocci et al. | 370/479 |
| 5,719,871 | 2/1998 | Helm et al. | 370/479 |

*Primary Examiner*—Alpus H. Hsu
*Attorney, Agent, or Firm*—George C. Pappas

[57] ABSTRACT

A packet voting server and associated method for performing voting services on multiple radio channels simultaneously and including capability to be dynamically assigned (trunked) to service any given radio channel, for example, on a packet by packet, call by call, or less frequent basis.

10 Claims, 7 Drawing Sheets

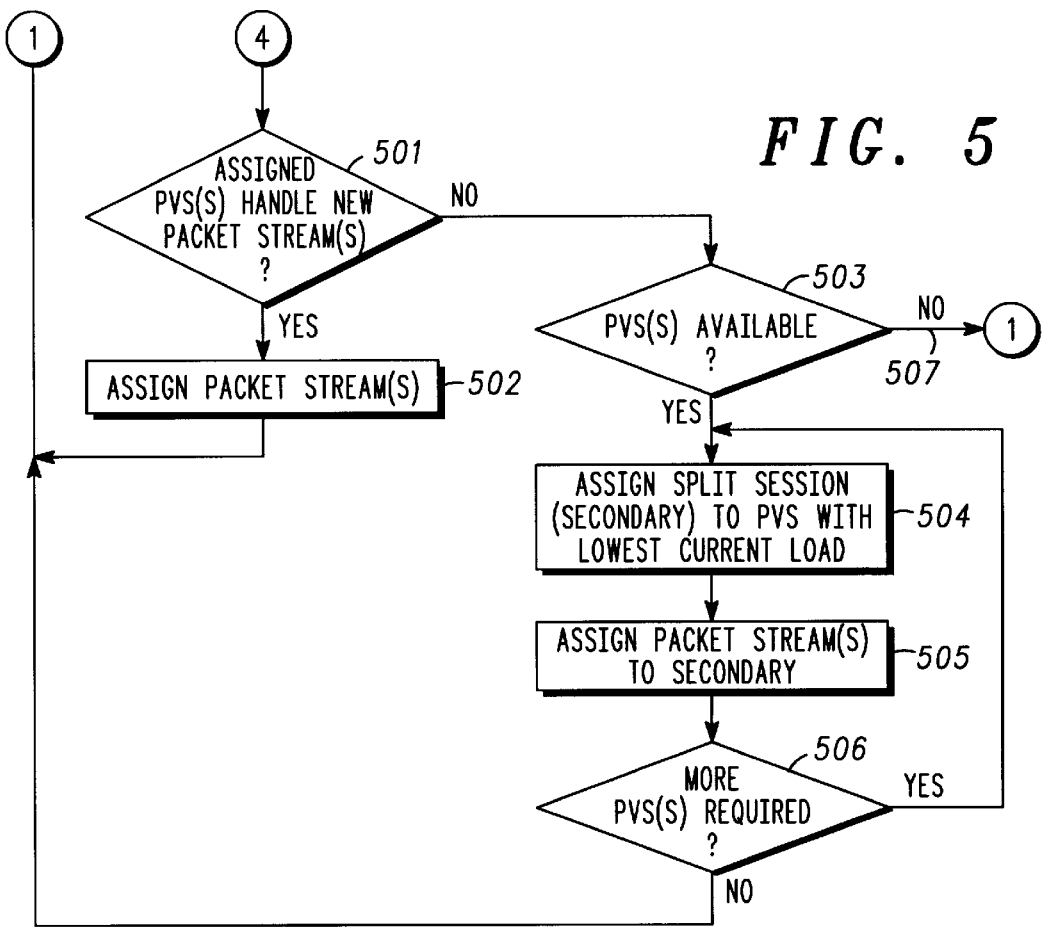
FIG. 5
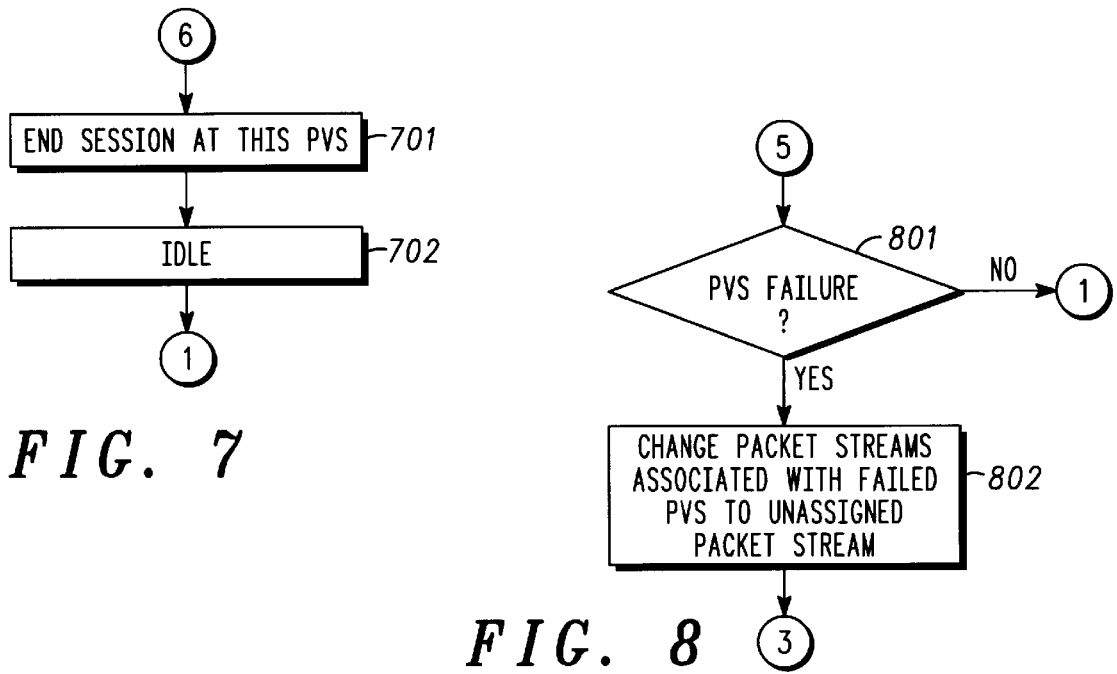
FIG. 7
FIG. 8

1
PACKET VOTING SERVER AND ASSOCIATED METHOD FOR PERFORMING VOTING SERVICES ON MULTIPLE RADIO CHANNELS SIMULTANEOUSLY

FIELD OF THE INVENTION

The present invention relates generally to communication systems and, in particular, to multi-channel voting in a digital communication system.

BACKGROUND OF THE INVENTION

Multiple site communication systems which comprise a plurality of repeaters and transceivers that are distributed throughout a large geographic region are well known. Many multi-site systems use same-frequency simulcast, i.e., the same communication channel (or carrier frequency) is used by multiple sites throughout the region to simultaneously relay communications to subscriber communication units that are located throughout the multi-site system. This is an efficient frequency reuse technique when the subscribers are routinely located throughout the multi-site system.

The use of comparators, and their associated voting algorithms, within simulcast communication systems is known. In general, a comparator, operably coupled to a plurality of base stations or satellite receivers located in geographically diverse areas, attempts to select or construct a favorable representation of an audio signal given multiple sources of the signal (e.g., the base stations). This is accomplished by comparing the signals received from the signal sources and selecting, from amongst all of the signal sources, portions of the signal having the best signal quality. The selected portions are then reassembled to produce a favorable voted signal frame. The voted signal frame can then be retransmitted by a base station, thereby increasing the probability of good reception (i.e., intelligibly decoded audio) at the signal destination (e.g., a mobile communication device). The signal selected as the best by the comparator is typically distributed therefrom to the transceiver sites for simultaneous re-transmission.

More recently, digital simulcast radio communication systems have been developed. In such systems, digital information is formatted into information frames. Each information frame is made up of a plurality of information packets that are transported through the system infrastructure.

Current systems allow for a single voting session to occur in each comparator, i.e. each comparator operates on and is dedicated to a single radio channel. This does not provide a cost effective means for operating in multi-channel trunking systems, systems where each radio channel represents a single radio frequency or a single time division multiplex (TDM) slot, since a separate comparator is necessary to service each of the multiple radio channels. Also in the current scheme the radio receivers of a given channel have connectivity only to a single comparator which does not provide fault tolerance in the event that the comparator fails, since currently the entire radio channel becomes inoperable.

The trunking (dynamic assignment) of single channel capable comparators is known. This trunking scheme employs a digital circuit switch to reroute all the individual point to point connections between each comparator and each of multiple base station receivers for each radio channel.

Conventional comparator trunking techniques do not allow for multiple radio channels to be serviced from a single device. Consequently, at present there is no way to load share the voting services in the event that a failure occurred to one or multiple comparators.

In addition, because each comparator must be provided with the capability of interfacing with all available base sites, when a specific voting session involves only a subset of the available sites, the remainder of the processing capability in the comparator could not be used to process another session. Conventional comparators and their associated algorithms do not provide a connection mechanism by which multiple radio channels could be brought into a single voting device to enable the former.

Therefore, a need exists for a providing voting services on multiple radio channels simultaneously by a single device and which device can be dynamically assigned (trunked) to service any given radio channel, for example, on a packet by packet, call by call, or less frequent basis.

BRIEF DESCRIPTION OF THE DRAWINGS

FIGS. 3–8 are detailed flow diagrams of the routines for coordinating multiple channel voting services among the multiple PVSs, the transition flow of which is shown in FIG. 2.

DETAILED DESCRIPTION OF THE PREFERRED EMBODIMENTS

Generally, the present invention is directed to a packet voting server and associated method for performing voting services on multiple radio channels simultaneously and including capability to be dynamically assigned (trunked) to service any given radio channel, for example, on a packet by packet, call by call, or less frequent basis.

Figure 1:
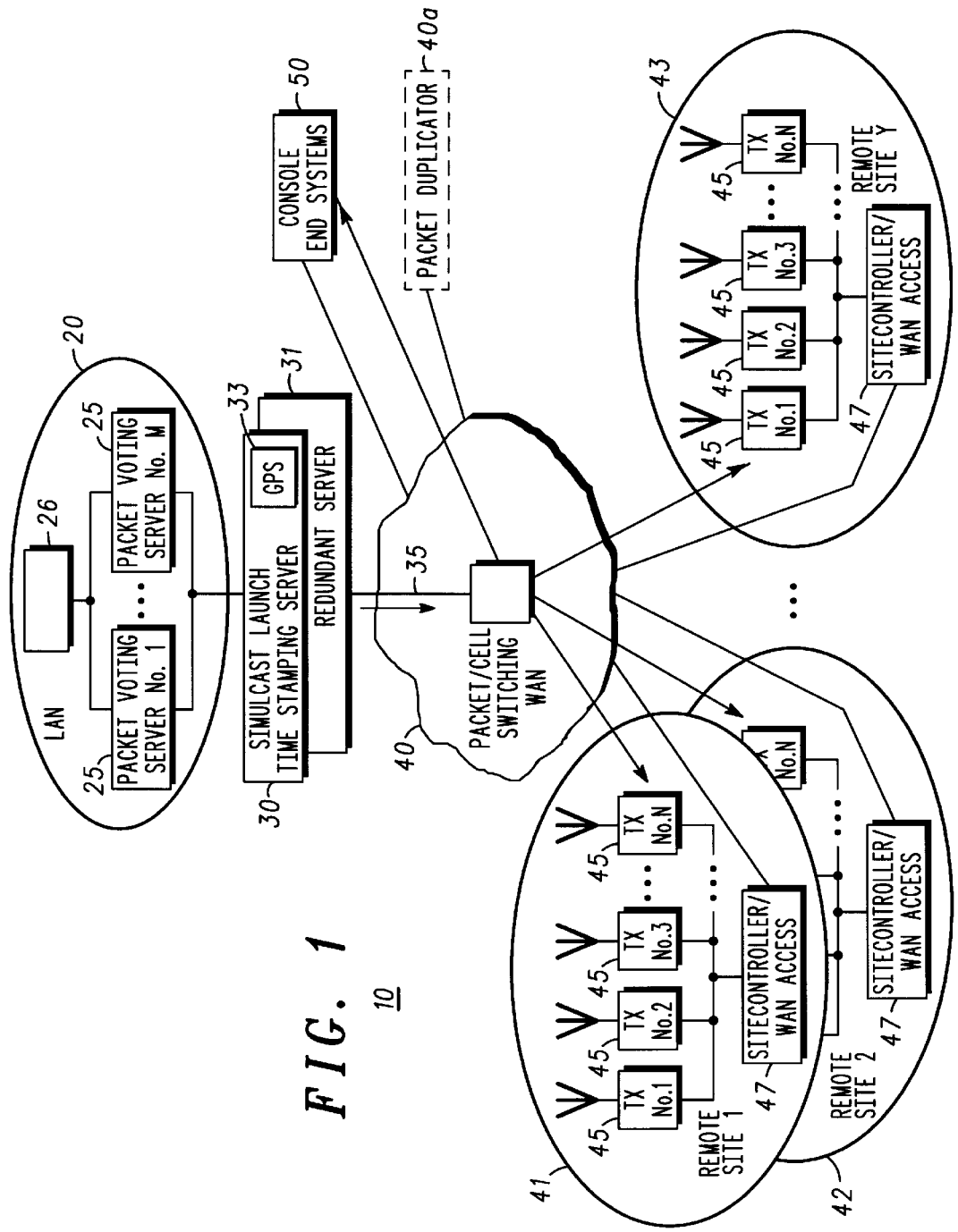
FIG. 1 illustrates a multi-channel simulcast system employing a comparator site network having multiple packet voting servers (PVSs) and a session control logic (SCL) controller constructed in accordance with the present invention.

The present invention can be more fully described with reference to FIGS. 1–9. FIG. 1 illustrates a block diagram depiction of the present invention.

Referring to FIG. 1, there is shown a multi-channel simulcast system 10 comprising a comparator site local area network (LAN) 20 including a plurality of packet voting servers (1-m) ("PVS"), generally designated by the numeral 25, and a session control logic (SCL) controller 26, The SCL controller 26 coordinates voting services among the plurality of PVSs 25 to facilitate multi-channel voting by a single (main) PVS. In this regard, when the main or initial PVS 25 assigned to service incoming packet streams—on one or more channels simultaneously—reaches maximum processing capacity, subsequent incoming streams are assigned for processing, by the SCL controller 26, to one or more other available (secondary) PVSs.

The SCL controller 26 coordinates main and secondary PVS voting activity in the manner to be described below in connection with FIGS. 2–8. Under SCL controller 26 command, each (main/secondary) PVS 25 operates on multiple radio channels simultaneously and selects (votes) best quality packets from the multiple receivers not shown on each radio channel, in the manner to be described in greater detail below in connection with the state transition diagram of FIG. 9.

Referring back to FIG. 1, the comparator site LAN 20 is shown connected to a primary simulcast launch timestamp server (SLTS) 30 coupled (via, for example, a single physical connection 35) to a communication packet/cell-switching network, such as for example a wide area network (WAN) 40 or a local area network (LAN), to allow multiple logical connections to be supported simultaneously on a single physical connection, as described generally in a co-pending related application Ser. No. 08/671,151, by the same inventors, entitled "Non-Packet Replicating Comparator Device for Digital Simulcast Packet Distribution", filed concurrently herewith and incorporated herein by reference. In the exemplary embodiment, the packet network 40—on its own or, alternatively, together with a packet duplicator 40a—replicates a seed copy of a voted packet to be simulcasted from each channel and distributes the replicated packets to selected ones of a plurality of group addressed simulcast transceiver sites 41, 42, 43, each comprising a plurality of simulcast transmitters 45 coupled to the WAN 40 via a WAN access site controller 47.

A second, redundant SLTS 31, connected to the WAN 40 in parallel with the primary SLTS 30, provides load sharing functionality and system redundancy in the event that SLTS 30 fails—as similarly described in another co-pending related application Ser. No. 08/078,413, again by the same inventors, entitled "Digital Multi-Channel Simulcast System with Centralized Timestamping Device", filed concurrently herewith and also incorporated herein by reference.

The SLTS 30 and redundant SLTS 31 apply simulcast launch times to all packets requiring simulcast transmission service These packets may be sourced from a wireline based end system 50, such as dispatch consoles, or may be voted packets from the comparator site LAN 20. The SLTS 30/31 thus generate a single seed copy of a timestamped (voted) packet which is addressed to a multicast address of a targeted radio channel and/or to appropriate console end systems 50.

In the exemplary constructional embodiment, the SLTS 30/31 is configured as a centralized timestamping device and includes a GPS receiver 33 for generating a precise time reference (generally a 1 pulse/second (1 PPS) signal) required for launch timestamping. The SLTS 30/31 functions to support multiple radio channels concurrently with the single time reference. A demultiplexing identifier (either explicitly identified in an accepted packet waiting timestamping or attached internally by the SLTS 30/31 on the basis of a connection identifier from the WAN 40) acts to keep each channel timestamping session independent. All timestamped packets for a given session are sent from the SLTS 30/31 to the set of simulcast transmitters 45 operating on a common radio frequency.

For a given multi-session voting operation, the comparator site LAN 20 is configured to permit each PVS 25 access to voice or data packets from any radio channel receiver in the system 10 via the wide area network (WAN) 40 which interconnects the various remote transceiver sites 41, 42, 43, where each transceiver site is able to send and receive several radio channels. The packet voting servers 25, by virtue of the LAN connection, receive information packet streams from any radio channel and hence can perform the voting operation on multiple radio channels simultaneously.

Each voting operation on a given radio channel at a specific instance in time is termed a voting session. When a request for a session is received from a subscriber, the SCL controller 26 processes the request and assigns a radio channel and a PVS 25 (main) to perform the voting service. The receivers on the assigned radio channel send their voice or data packets to the assigned (main) PVS 25 which then selects the best packet for retransmission to the radio channel and to send to any console based end systems.

Under SCL controller 26 supervision, a PVS 25 can be assigned to service multiple sessions simultaneously, each of which is occurring on a different radio channel. In accordance with the present invention, the SCL controller 26 may assign an initial or main packet voting server 25 to support a set of radio channels. This allocation may be dynamic to any degree; one time provisioned, assigned on a call by call basis, or even finer if necessary, e.g. packet by packet. The receiver sites are informed of which radio channels are being serviced by which server at any given time for each voting session.

Upon a subscriber transmission, one or multiple receivers tuned to the same radio channel (one at each remote site) will receive the subscriber information packet stream transmission and send the received packet stream to the currently allocated packet voting server 25 (main) assigned to that radio channel. The individual packets in the information packet stream are targeted to the proper (main) packet voting server 25 by using the appropriate destination address or virtual circuit identifier for the LAN/WAN 40.

Concurrently, other radio channels assigned to the same (main) packet voting server 25 may become active, with the remote sites sending their received information packet stream to the voting server 25. All packets sent to the voting servers 25 must have either an implicit or explicit indication of the radio channel number, voting session identifier, or information packet stream number as well as an indication of position of the packet within packet stream on the air interface. The techniques to form such indications are all well known in the art and form no part of this invention.

Each voting server 25, in turn, accepts these packets from its LAN interface and deinterleaves the packets associated with each voting session assigned to it, based on the source address, the virtual circuit identifier, explicit radio channel number, or information packet stream number indication in the packet.

The deinterleaved packets for a given voting session are then voted upon using standard procedures. For each voting session in the packet voting server, one vote occurs on all the packets from the same position in the packet stream from the same radio channel. The voted/selected packet for this position in the packet stream is sent out on the LAN to the timestamping server. The packet voting server continues voting each packet position for each voting session it is processing.

Figure 2:
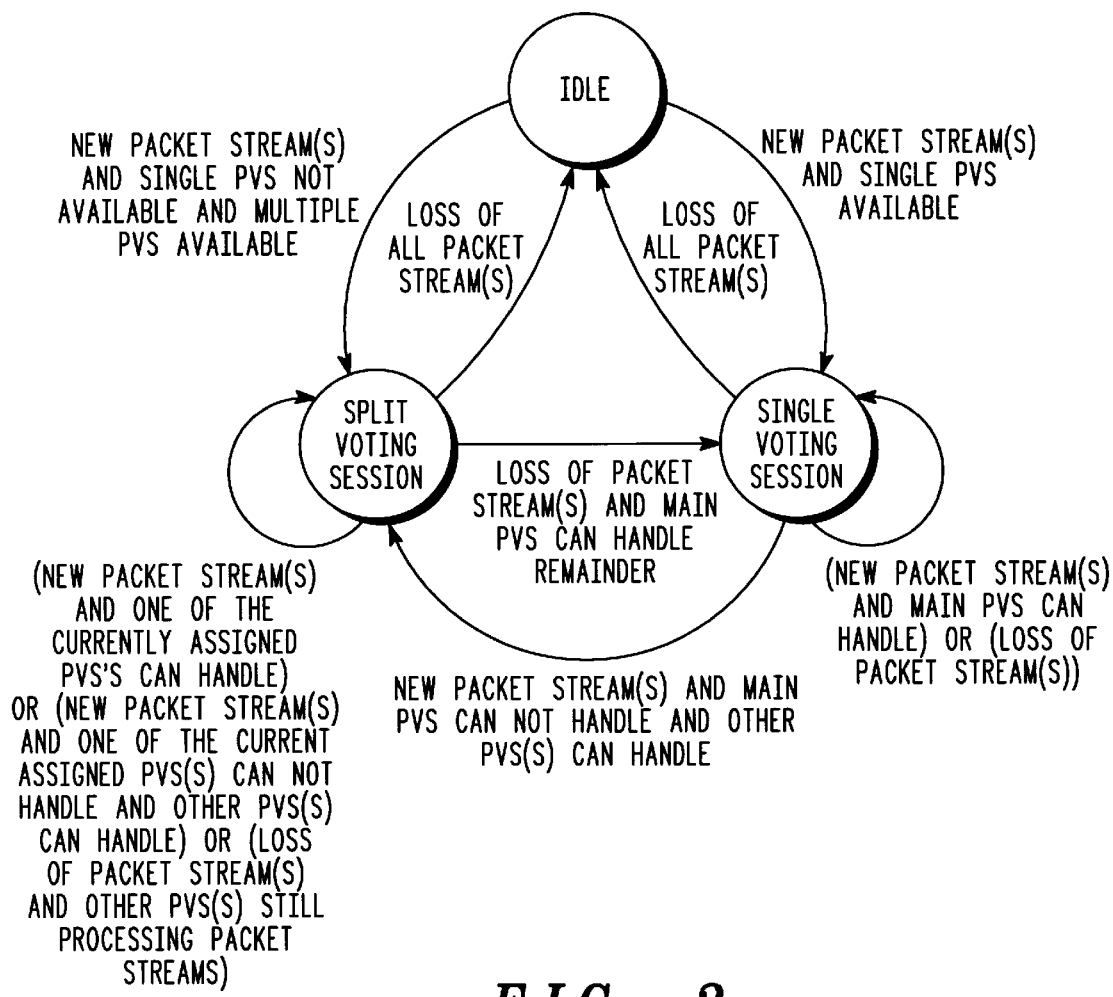
FIG. 2 is a state transition diagram generally showing the operational flow for coordinating multiple channel voting services among multiple PVSs, under command by the SCL controller, in accordance with the present invention.

FIGS. 3–8 are detailed flow diagrams of the routines for the coordination, by the SCL controller 26, of multiple channel voting services among the multiple PVSs, the transition flow of which is shown in FIG. 2. Taken together with the PVS state transition diagram shown in FIG. 9, the voting services scheme is described as follows.

Figure 3:
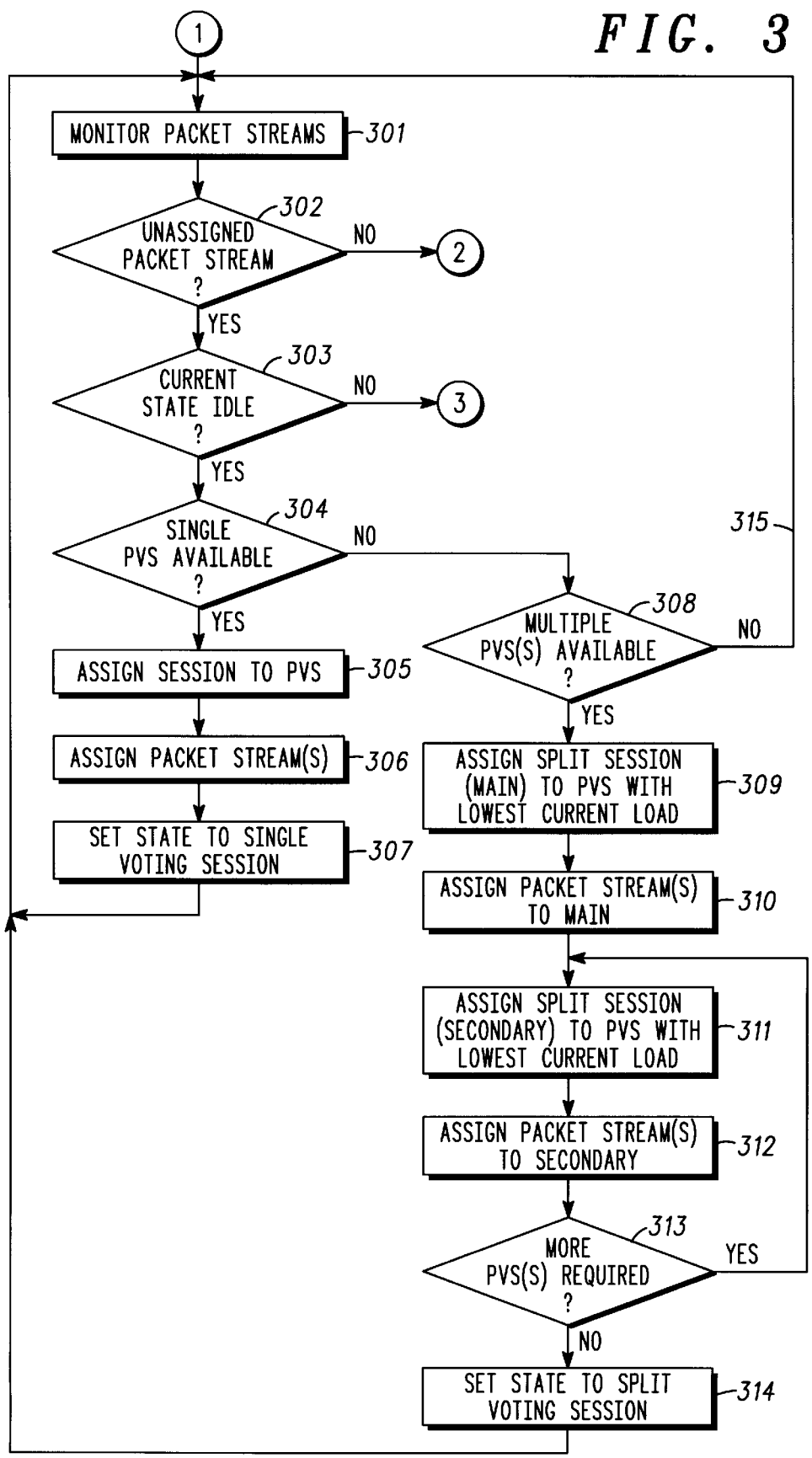

Referring to FIG. 3, there is shown a main processing routine 1, implemented under command by the SCL controller 26. As incoming packet streams are received (301), each is evaluated to determine what channel it is associated with and whether it is part of a previously assigned packet stream (302). If unassigned, then if the current state of this voting session in all of the PVS(s) is idle (i.e., no packets currently being processed) (303), a single available PVS 25 (hereon the 'main' PVS), if one is available (304), is assigned the voting session (305) for which voting session the incoming packet stream(s) will be assigned. The controller 26 then changes the voting session state assignment for that PVS from idle to a single voting session (307), indicative that the voting session is in a state to process any subsequently received incoming packets, associated with a currently active call, using a 'single' PVS.

In the event a single PVS is not available to process the incoming packet streams(s), usually due to other voting activity assigned to the comparator system 20, then the PVSs are evaluated to find one with the lowest current load (308). Once found, a split session assignment is made to the lowest current load PVS (initially termed 'main') and a subset of the received incoming packet streams are assigned to the main PVS (310) up to the capacity of the main PVS. The remainder of incoming packet stream(s) is not automatically assigned to the main PVS but is instead assigned to the PVS with the lowest load at the time of the assignment. If the newly employed PVS is other than the main PVS, it is termed 'secondary' and a split session assignment designation for the given call (311, 312) is made. The assignment of incoming packet streams to multiple PVSs on a lowest load basis continues until all incoming packets have been assigned (repeat loop 311–313). Once all continuous incoming packets associated with a portion of a call are assigned, the session state is designated a split voting session (314), indicative that the LAN 20 is currently set to provide voting services of received incoming packet streams associated with the active call, which services are to be performed simultaneously but split among a main PVS and one or more secondary PVSs. In the event no PVS is available to process the incoming packet streams, the packets are held for future assignment (315).

Figure 4:
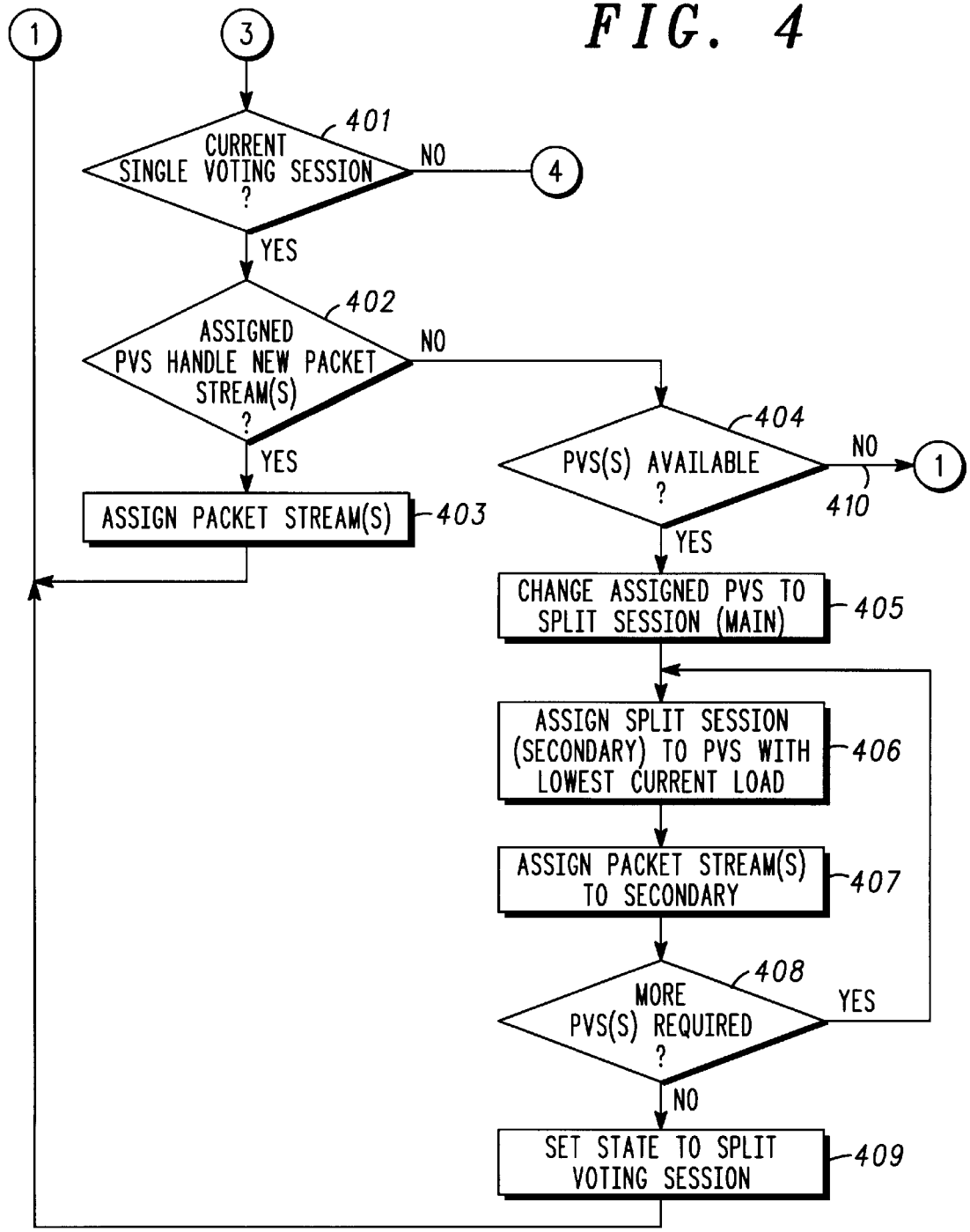

Referring to FIG. 4, there is shown a routine 3 (see FIG. 3) for handling incoming packet streams associated with a call in the instance where the current session status for the particular call is for single voting session (401), which means that a single (main) PVS was earlier assigned to provide voting services for that call. If the main PVS has the capability to handle the next batch of incoming packet streams (402), the packets are assigned for processing by the main PVS (403), else the currently active PVSs assigned to other calls are employed in a split session assignment scheme (404–408), i.e., among one or more cooperating PVSs (on a lowest current load basis), as generally described above for unassigned packet streams in routine 1. Once again, once all continuous incoming packets associated with a portion of a call are assigned, the session state designation is set to split voting session (409). In the event no PVS is available to process the incoming packet streams, the packets are here again subject to being held for future assignment (410).

Referring to FIG. 5, there is shown a routine 4 (see FIG. 4) for handling incoming packet streams associated with an active call in the instance where the current session status for the particular call is for split voting session (401), which means that one or more earlier assigned (main and secondary) PVSs are currently actively employed to provide voting services for that call. If these active PVSs have the capability to handle the next batch of incoming packet streams (501), the packets are assigned for processing thereto (502), else the currently active PVSs assigned to other calls are employed in a split session assignment scheme (503–506), i.e., among one or more cooperating PVSs (on a lowest current load basis), as generally described above for unassigned packet streams in routine 1 (and routine 2). In the event no PVS is available to process the incoming packet streams, the packets are here again subject to being held for future assignment (507).

Figure 6:
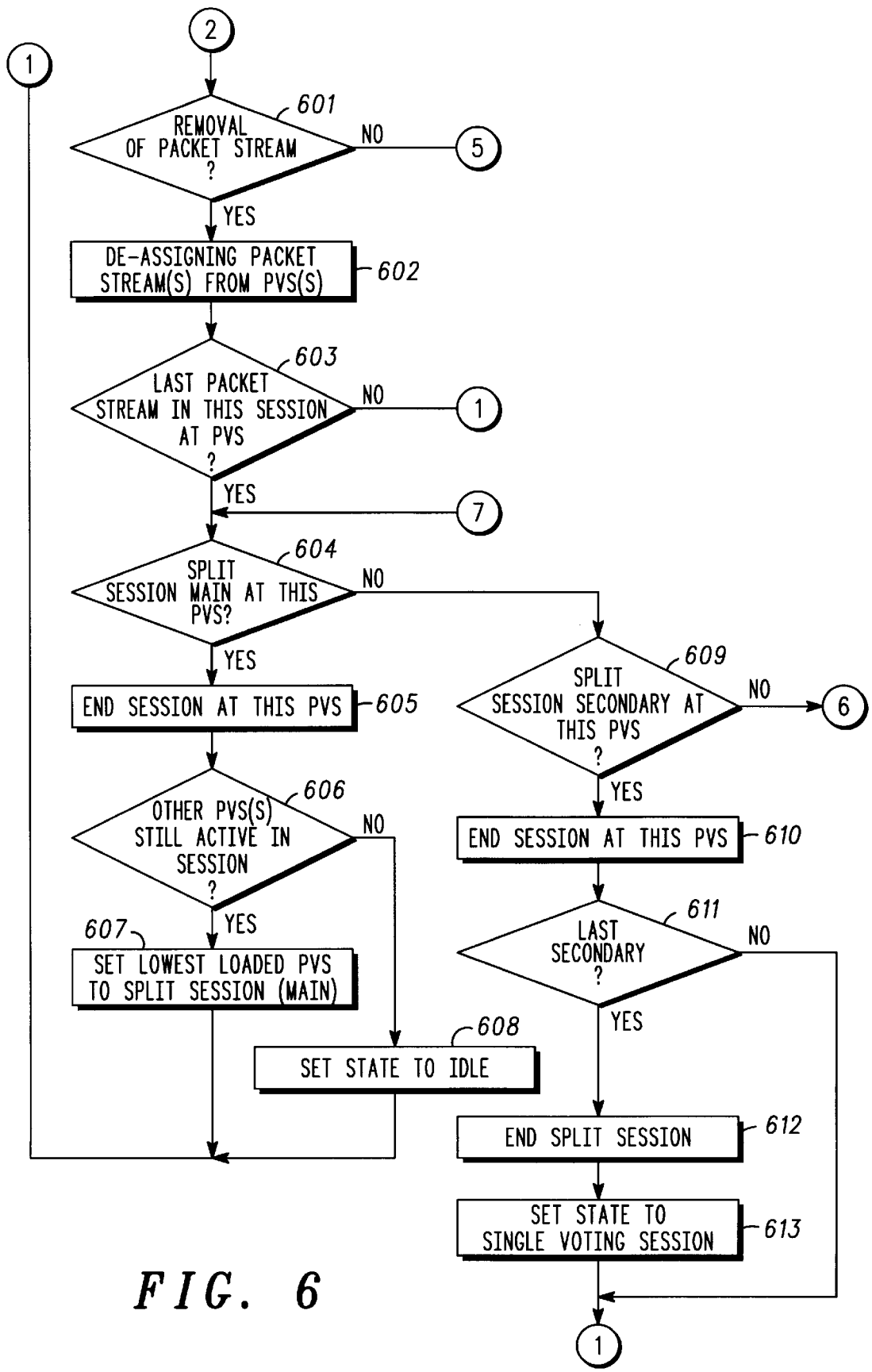

Referring to FIG. 6, there is shown a routine 2 (see FIG. 3) for deassigning packet streams from PVSs to reduce the loading and improve the processing capacity thereof when the voting services for a packet stream(s) are no longer needed. Since the purpose of voting is to select or construct a favorable representation of an audio signal given multiple received incoming packet streams of the same signal, it necessarily follows that a base site that ceases to transmit an audio signal is out of range and therefore any recently transmitted packet streams from that base site to the comparator site LAN will not yield a favorable audio signal. Hence, voting such signals is unnecessary, as would be maintaining active an assignment thereof of the packet streams to a current voting session, by an associated PVS or PVSs, whether single voting session or split voting session.

Removal/deassignment of an unwanted packet stream(s) from its previously assigned PVS (601–603), is effected as follows. When the PVS is a split session (main) PVS (604) for this session, the PVS session is ended (604). When other PVS(s) still processing packet streams for this session (606) are active, the lowest loaded PVS involved in session is set to split session (main) (607). When there are no other PVS(s) still active in the session (606) the session state is set to idle (608). If the PVS assigned for this packet stream(s) is a split session (secondary) PVS (609) and there are no other packet stream(s) for this session assigned to this PVS, the session for the PVS is ended (610). If this is the last secondary PVS (611), the split session is ended (612) and the session state is set to single voting session (613). Referring to FIG. 7, when the current session to be removed is not a split session, i.e., it is a single session, that session is ended (701) and the session state set to idle (702).

One critical advantage of the present voting services scheme described herein, is that once a PVS failure is detected (801), the SCL controller 26 can be employed (see FIG. 8) to change the status of packet streams associated with a failed PVS to 'unassigned' (802) Because doing so may change the session state from, for example, 'split session (secondary)' to 'split session (main)', or from 'single session' to 'idle', the portion of routine 2 (see FIG. 6) for effecting removal of packet streams is entered (see steps 604–613). The newly unassigned packet streams are then reassigned as unassigned packet streams by entering routine 1 (see FIG. 3).

It should be understood that the operational flow described above in connection with the present invention multiple channel voting services scheme is coordinated by the SCL controller 26, and has generally been described in a simulcast communication environment, but may also be implemented in a non-simulcast trunked radio system.

Figure 9:
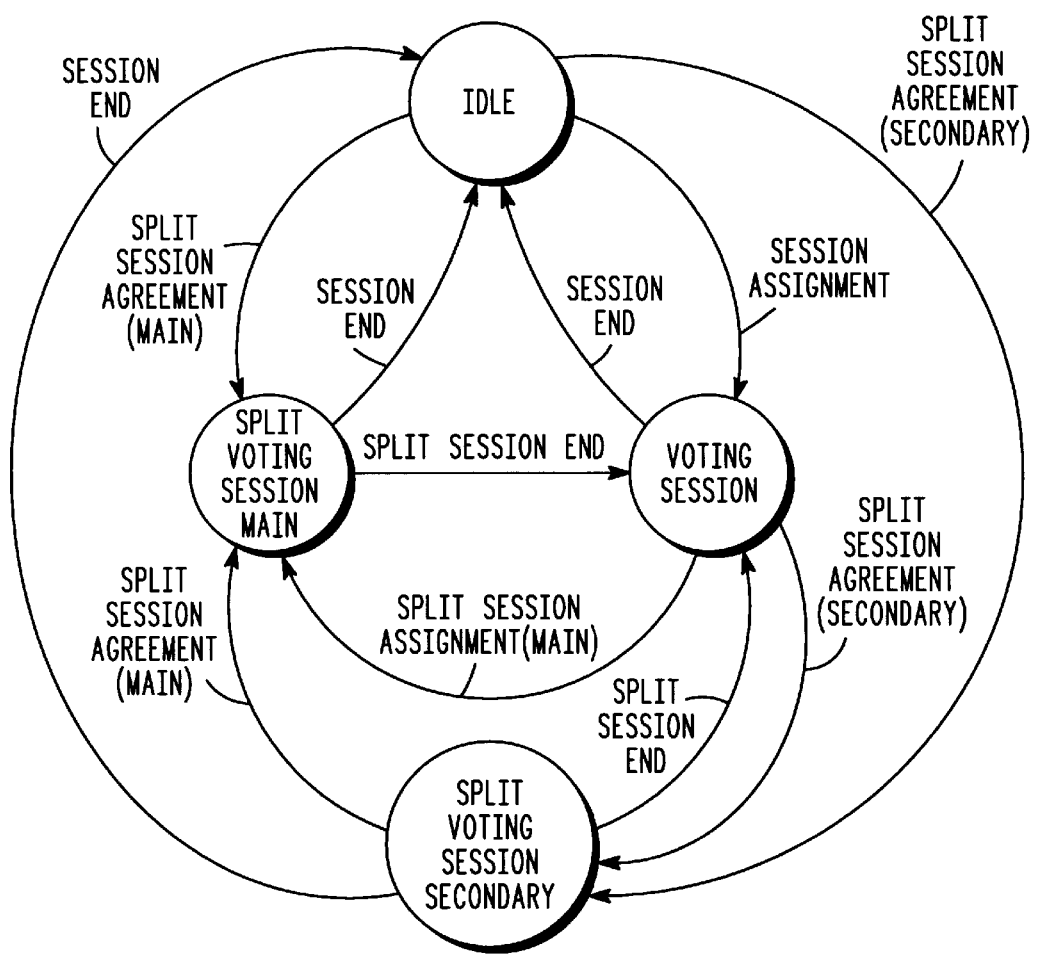
FIG. 9 is a state transition diagram generally showing the operational flow for each PVS for providing single and split session voting, as commanded by the SCL controller, in accordance with the present invention.

Because each PVS 25 in the system operates independently and implements the state transition diagram shown in FIG. 9—as commanded by the SCL controller 26—PVS fault redundancy can be readily implemented in the event of PVS failure, in the manner described herein.

It should be appreciated that the multi-session voting scheme described above allows using a single voting server to support multiple voting sessions occurring on multiple radio channels simultaneously, whereas previously only a single voting session was supported. This is done using only one physical connection to the PVS 25—a LAN interface connection—to accept packets from multiple radio channels simultaneously.

The present scheme yields a cost effective method for servicing multiple voting channels. The single point of failure for a voted radio channel is eliminated in a manner that does not diminish the total number of channels that could be used in the system after the failure. Finally, fewer connections at the voting site translates to simpler installation and maintenance.

It should further be appreciated that fewer voting devices are necessary to support a multi-channel voting system, which is very cost effective and more reliable from an opportunity-for-failure perspective.

Also, a comparator site LAN connection enables multi-channel connectivity that was not possible with the individual point to point circuit connections of current comparator schemes and is significantly more cost effective. A single LAN connection is also easier to install and maintain than the multi-cable connection to each comparator in such current comparator schemes The present implementation provides a way for supporting all the radio channels in the system in the event of a comparator (PVS) failure, whereas in existing comparator schemes, simple trunking of the comparators will necessarily require taking the failed channel out of service as the number of non-failed comparators drops below the number of active channels even through the active comparators have enough remaining processing capacity to process the failed channel.

While the present invention has been particularly shown and described with reference to particular embodiments thereof, it will be understood by those skilled in the art that various changes in form and details may be made therein without departing from the spirit and scope of the present invention.

We claim:

1. In a digital communication system having a comparator site local area network including a session control logic (SCL) controller and a plurality of packet voting servers (PVSs), a method for performing voting services on incoming packet streams, all of which are associated with a current voting session and received over multiple radio channels simultaneously, comprising the SCL controller performed steps of:

monitoring the incoming packet streams to identify
(i) unassigned packet streams, corresponding to packet streams received over at least one of said multiple radio channels the packet streams from which, at time of identification, are not assigned for processing by predetermined ones of said plurality of PVS to provide voting services during the current session, and
(ii) assigned packet streams, corresponding to packet streams received over at least one of said multiple radio channels the packet streams from which, at time of identification, are assigned for processing by predetermined ones of said plurality of PVS;

assigning the unassigned incoming packets for voting by a first one of said plurality of PVSs, when a PVS is available that can handle voting the unassigned incoming packets; and assigning the unassigned incoming packets to at least one of said plurality of PVSs when a PVS is not available, on the basis of a predetermined condition.

2. The method of claim 1, wherein said predetermined condition involves identifying a PVS, at the time of assignment, with a lowest current load.

3. The method of claim 2, further comprising the step of deassigning assigned packet streams from associated ones of said plurality of PVSs.

4. The method of claim 1, further comprising the steps of
assigning assigned packets to the associated predetermined ones of said plurality of PVSs when said associated ones can handle voting the assigned packets, and
assigning the assigned incoming packets to at least one of said plurality of PVSs, other than said associated ones, when the associated ones cannot handle voting the assigned packets.

5. The method of claim 4, wherein the step of assigning when the associated ones cannot handle voting the assigned packets, involves assigning said at least one of said plurality of PVSs on the basis of a predetermined condition.

6. The method of claim 5, wherein said predetermined condition involves identifying a PVS, at the time of assignment, with a lowest current load.

7. The method of claim 6, further comprising the step of deassigning assigned packet streams from associated ones of said plurality of PVSs.

8. The method of claim 5, further comprising the step of deassigning assigned packet streams from associated ones of said plurality of PVSs.

9. The method of claim 4, further comprising the step of deassigning assigned packet streams from associated ones of said plurality of PVSs.

10. The method of claim 1, further comprising the step of deassigning assigned packet streams from associated ones of said plurality of PVSs.

* * * * *